(12) United States Patent
Zebian

(10) Patent No.: US 11,391,220 B2
(45) Date of Patent: Jul. 19, 2022

(54) REGULATION SYSTEM COMPRISING A VALVE, A REGULATOR, AN ACTUATOR AND A COOLING SYSTEM USING HEAT PIPES

(71) Applicant: Airbus Operations SAS, Toulouse (FR)

(72) Inventor: Maxime Zebian, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/185,364

(22) Filed: Feb. 25, 2021

(65) Prior Publication Data
US 2021/0270191 A1 Sep. 2, 2021

(30) Foreign Application Priority Data
Feb. 27, 2020 (FR) .................................. 2001954

(51) Int. Cl.
| | | |
|---|---|---|
| *F02C 9/18* | (2006.01) | |
| *F02C 1/00* | (2006.01) | |
| *F16K 31/40* | (2006.01) | |
| *F16K 31/363* | (2006.01) | |
| *F02C 9/20* | (2006.01) | |
| *F02C 7/18* | (2006.01) | |

(52) U.S. Cl.
CPC .................. *F02C 9/18* (2013.01); *F02C 1/00* (2013.01); *F02C 7/185* (2013.01); *F02C 9/20* (2013.01); *F16K 31/363* (2013.01); *F16K 31/406* (2013.01); *F05D 2220/323* (2013.01)

(58) Field of Classification Search
CPC ...... F02C 9/18; F02C 9/20; F02C 1/00; F02C 7/185; F05D 2220/323; F05D 2260/208; F16K 31/363; F16K 31/406

USPC .......................................................... 137/488
See application file for complete search history.

(56) References Cited

U.S. PATENT DOCUMENTS

| | | | | |
|---|---|---|---|---|
| 3,769,998 A | * | 11/1973 | Avant .................... | F16K 31/365 |
| | | | | 137/487 |
| 3,776,266 A | | 12/1973 | Bass et al. | |
| 3,792,716 A | | 2/1974 | Sime et al. | |
| 3,865,128 A | | 2/1975 | Zadoo | |
| 4,617,958 A | * | 10/1986 | Seidel .................. | G05D 16/163 |
| | | | | 137/488 |

(Continued)

FOREIGN PATENT DOCUMENTS

EP          2241728 A2    10/2010

OTHER PUBLICATIONS

French Search Report; priority document.

*Primary Examiner* — Steven M Sutherland
(74) *Attorney, Agent, or Firm* — Greer, Burns & Crain, Ltd.

(57) ABSTRACT

A regulation system to regulate the flow rate of a hot air duct which comprises a shutter, an upstream air intake, a downstream air intake, a regulator and an actuator of the shutter with a first inlet connected to an outlet of the regulator and a cooling system comprising an outer radiator, a housing and a heat pipe housed in the housing and discharging the heat between the housing and the outer radiator, wherein the air streams coming from the upstream air intake and from the downstream air intake pass through the housing. Such a regulation system allows a better discharging of the heat by the action of the heat pipes.

9 Claims, 2 Drawing Sheets

(56) References Cited

U.S. PATENT DOCUMENTS

| | | | | |
|---|---|---|---|---|
| 6,694,746 | B2* | 2/2004 | Reed | F02C 7/047 |
| | | | | 137/488 |
| 7,025,088 | B2* | 4/2006 | Saunders | F01D 17/20 |
| | | | | 137/553 |
| 7,066,710 | B2* | 6/2006 | Wiggins | F02C 7/277 |
| | | | | 137/488 |
| 8,286,661 | B2* | 10/2012 | Krake | F16K 31/423 |
| | | | | 137/487 |
| 9,797,310 | B2* | 10/2017 | Ekanayake | F01K 23/02 |
| 2005/0276685 | A1* | 12/2005 | Wiggins | F16K 31/42 |
| | | | | 137/488 |
| 2010/0263350 | A1 | 10/2010 | Liu et al. | |

* cited by examiner

REGULATION SYSTEM COMPRISING A VALVE, A REGULATOR, AN ACTUATOR AND A COOLING SYSTEM USING HEAT PIPES

CROSS-REFERENCES TO RELATED APPLICATIONS

This application claims the benefit of the French patent application No. 2001954 filed on Feb. 27, 2020, the entire disclosures of which are incorporated herein by way of reference.

FIELD OF THE INVENTION

The present invention relates to a regulation system comprising a valve, a regulator, an actuator and a cooling system using heat pipes, a turbojet engine comprising at least one such regulation system, and an aircraft comprising at least one such turbojet engine.

BACKGROUND OF THE INVENTION

FIG. 4 shows a regulation system 300 of the state of the art. The regulation system 300 is implemented on a duct 50 in which circulates hot air which, in the case of an aircraft, can come from the compression stages of the turbojet engine of the aircraft.

The regulation system 300 comprises a valve 302 equipped with a shutter 303 which is housed in the duct 50 and which is movable so as to, more or less, block the duct 50 in order to regulate the flow rate of air in the duct 50.

The regulation system 300 also comprises an actuator 304 which, here, takes the form of a power cylinder whose piston 306 divides the cylinder 308 into two chambers and whose rod 310, secured to the piston 306, actuates the shutter 303. The transmission between the rod 310 and the shutter 303 is not described because that depends on the environment and on the mode of transmission between the rod 310 and the shutter 303.

Upstream of the valve 302, the regulation system 300 comprises an upstream air intake 312 arranged on the duct 50, and, downstream of the valve 302, the regulation system 300 comprises a downstream air intake 314 arranged on the duct 50.

The regulation system 300 also comprises a regulator 316 which here comprises, in series, a pressure reducer 315 and a solenoid valve 317. The pressure reducer 315 allows the pressure arriving on the solenoid valve 317 to be limited and the solenoid valve 317 works as a switch by allowing the air to pass when the pressure is above a threshold.

The upstream air intake 312 is fluidically connected to an inlet of the regulator 316 and an outlet of the regulator 316 is fluidically connected to a first inlet of the actuator 304, and, here, to one of the chambers of the actuator 304.

The downstream air intake 314 is fluidically connected to a second inlet of the actuator 304, and, here, to the other chamber of the actuator 304.

The actuator 304 works by pressure difference between its two inlets, and therefore between the pressure upstream of the valve 302 and the pressure downstream of the valve 302. Based on the pressure difference, the actuator 304 will move the shutter 303 for it to, more or less, block the duct 50.

The air taken from the duct 50 and which penetrates into the regulator 316 or into the actuator 304 is at a high temperature. To allow optimal operation of the regulator 316 and of the actuator 304, the latter must be cooled. To that end, a cool air stream 52 is taken, in particular from a secondary air flow of the turbojet engine, and directed to the regulator 316 and the actuator 304.

While such a regulation system 300 works effectively with current engines, it requires dedicated cooling which generates additional fuel consumption. Furthermore, this cooling risks reaching its limits with the arrival of new engines generating higher air temperatures. Indeed, in conserving this cooling principle, the cool air streams will have to be augmented by a greater tapping from the secondary air flow, to the detriment of the efficiency of the turbojet engine.

It is therefore necessary to find a regulation system which comprises means for more efficiently discharging heat.

SUMMARY OF THE INVENTION

One object of the present invention is to propose a pneumatic regulation system comprising a cooling system which allows a better discharging of the heat.

To this end, a regulation system is proposed that is intended to ensure the flow rate regulation of a duct in which circulates a hot air stream, the regulation system comprising:
a valve equipped with a shutter configured to be housed in the duct,
an upstream air intake configured to be arranged on the duct upstream of the valve,
a downstream air intake configured to be arranged on the duct downstream of the valve,
a regulator comprising an inlet and an outlet and allowing or preventing the passage of the air based on the pressure at its inlet, and
an actuator actuating the shutter and comprising a first inlet and a second inlet, in which the first inlet is fluidically connected to the outlet of the regulator,
the regulation system being characterized in that it comprises a cooling system which comprises:
an outer radiator subjected to an air stream,
a housing comprising a first inlet, a second inlet, a first outlet and a second outlet, a first fluidic path, inside the housing, fluidically connecting the first inlet and the first outlet through the housing, and a second fluidic path, inside the housing, fluidically connecting the second inlet and the second outlet through the housing, the two fluidic paths being separated,
at least one heat pipe, each heat pipe comprising a first end in contact with the outer radiator and a second end housed in the housing,
a first upstream duct fluidically connecting the upstream intake to the first inlet of the housing,
a second upstream duct fluidically connecting the first outlet of the housing to the inlet of the regulator,
a first downstream duct fluidically connecting the downstream intake to the second inlet of the housing, and
a second downstream duct fluidically connecting the second outlet of the housing to the second inlet of the actuator.

Such a regulation system allows a better discharging of the heat through the action of the heat pipes and does so without requiring augmentation of the cool air streams taken from the secondary air flow in the case of a turbojet engine.

According to a particular embodiment, the housing is divided into two chambers fluidically isolated from one another by an internal wall, the second end of each heat pipe is present in each chamber, the first fluidic path comprises one of the chambers which extends between the first inlet and the first outlet of the housing, and the second fluidic path comprises the other chamber which extends between the second inlet and the second outlet of the housing. The pressure in the two chambers is different.

According to another particular embodiment, the first fluidic path comprises a first internal duct fluidically connected between the first upstream duct and the second upstream duct, and the second fluidic path comprises a second internal duct fluidically connected between the first downstream duct and the second downstream duct.

Advantageously, the first internal duct and the second internal duct are wound around the second end of each heat pipe.

Advantageously, at least one heat pipe is in contact with walls of the regulator.

Advantageously, the outer radiator comprises fins and each heat pipe passes through the fins through an orifice provided for that purpose in each fin.

The invention also proposes a turbojet engine of an aircraft, the turbojet engine comprising compression stages, a duct in which circulates a hot air stream coming from the compression stages and a regulation system according to one of the preceding variants.

Advantageously, the turbojet engine comprises a secondary air flow and the outer radiator is subjected to an air stream taken from the secondary air flow.

The invention also proposes an aircraft comprising a turbojet engine according to one of the preceding variants.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

Figure 1:
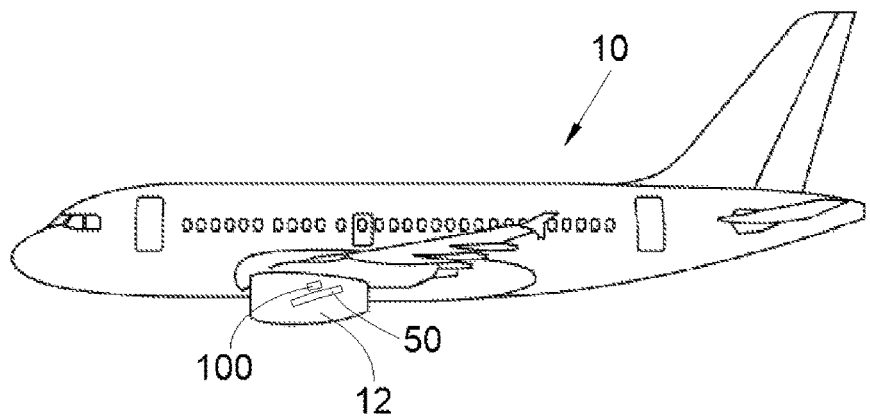
FIG. 1 is a side view of an aircraft comprising a regulation system according to the invention.

FIG. 1 shows an aircraft 10 which comprises a turbojet engine 12 with compression stages, a duct 50 in which circulates a hot air stream coming from the compression stages and a regulation system 100 according to the invention. In particular, the turbojet engine 12 is of the dual flow turbofan engine type and it comprises a secondary air flow supplied with cool air through a fan.

Figure 2:
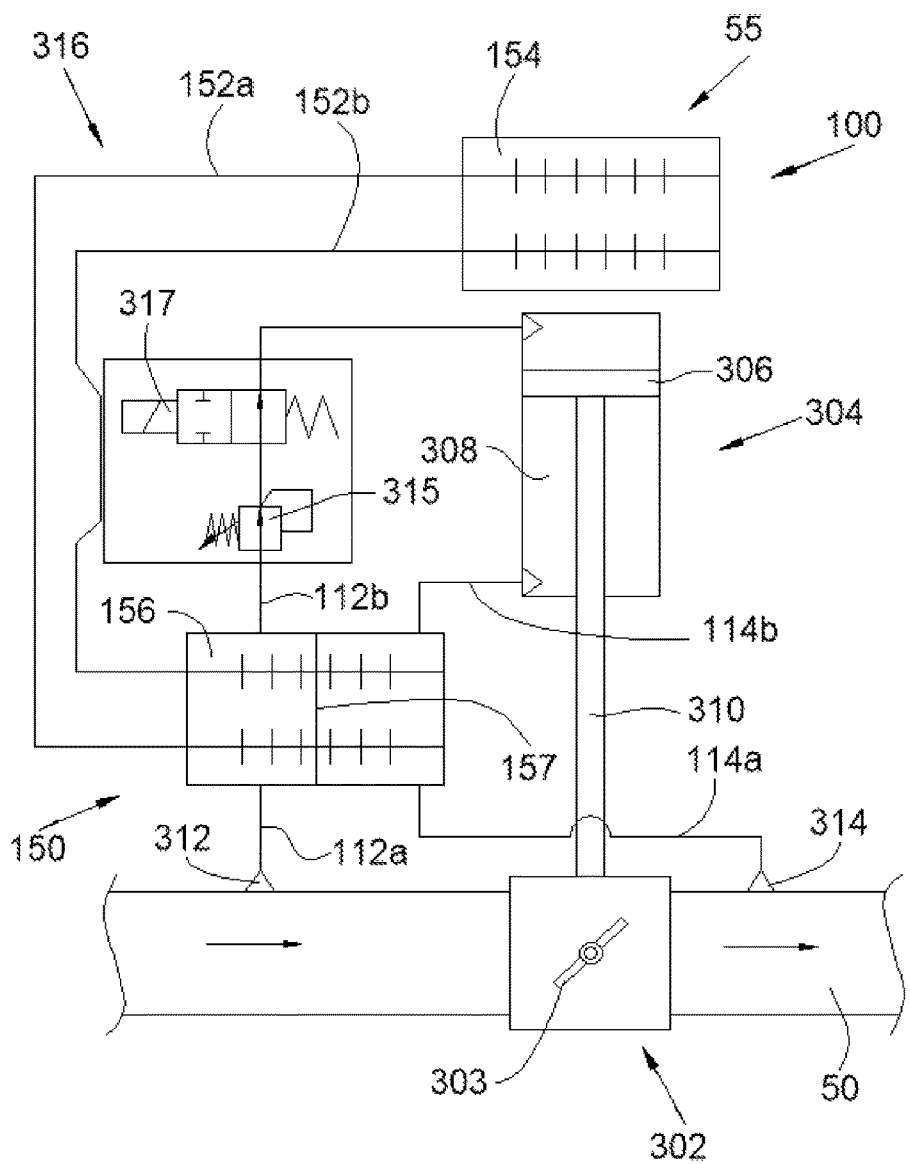
FIG. 2 is a schematic representation of a regulation system according to the invention.

FIG. 2 shows the regulation system 100 according to the invention which comprises certain elements in common with those of the regulation system 300 of the state of the art. These elements bear the same references.

The regulation system 100 comprises a valve 302 equipped with a shutter 303 which is housed in the duct 50 and which is movable so as to, more or less, block the duct 50 in order to regulate the air flow rate in the duct 50. In the duct 50, hot air circulates which, in the case of an aircraft 10, can come from the compression stages of the turbojet engine 12 of the aircraft 10.

Upstream of the valve 302, the regulation system 100 comprises an upstream air intake 312 arranged on the duct 50, and, downstream of the valve 302, the regulation system 100 comprises a downstream air intake 314 arranged on the duct 50. Each air intake 312, 314 allows the capture of a portion of the air stream circulating in the duct 50.

The regulation system 100 also comprises an actuator 304 which is a hydraulic or pneumatic or electropneumatic actuator as represented in FIG. 2, that is to say, it operates by pressure difference between the pressure of the air taken from the duct 50 at the upstream air intake 312 and the pressure of the air taken from the duct 50 at the downstream air intake 314. The actuator 304 actuates the shutter 303 and it is subjected to heating due to the hot air taken from the duct 50. The actuator 304 has a first inlet and a second inlet.

In the embodiment of the invention presented here, the actuator 304 takes the form of a power cylinder whose piston 306 divides the cylinder 308 into two chambers and whose rod 310, secured to the piston 306, actuates the shutter 303. The transmission between the rod 310 and the shutter 303 is not described because that depends on the environment and on the mode of transmission between the rod 310 and the shutter 303. According to embodiments of the invention, the transmission can take the form of a control rod, a rack mechanism, etc.

The regulation system 100 also comprises a regulator 316 which is a pneumatic or electropneumatic regulator, that is to say, it works with the air taken from the duct 50, here at the upstream air intake 312. The regulator 316 is thus also subjected to the heating due to the hot air taken in this way.

In the embodiment of the invention presented here, the regulator 316 comprises, in series, a pressure reducer 315 and a solenoid valve 317 which work as in the case of the state of the art. The pressure reducer 315 makes it possible to limit the pressure arriving on the solenoid valve 317 and the solenoid valve 317 works as a switch by allowing the air to pass when the pressure is above a threshold.

The regulator 316 comprises an inlet and an outlet and it allows or prevents the passage of the air based on the pressure at its inlet, that is to say, here, at the upstream air intake 312. The first inlet of the actuator 304 is fluidically connected to the outlet of the regulator 316.

To limit the temperature of the air, the regulation system 100 also comprises a cooling system 150. The cooling system 150 comprises at least one heat pipe 152a-b and one outer radiator 154 subjected to an air stream 55 which is taken, in particular, from the secondary air flow of the turbojet engine 12 and which is, therefore, cooler than the hot air circulating in the duct 50. Here, the outer radiator 154 comprises fins which ensure a better heat exchange with the cool air stream 55.

Each heat pipe 152a-b takes the form of a hollow tube of circular, elliptical or parallelepipedal form. The heat pipe 152a-b is leak-tight and filled with heat-transfer fluid in liquid/vapor thermodynamic equilibrium.

Each heat pipe 152a-b extends between a first end and a second end.

The first end of each heat pipe 152a-b is in contact with the outer radiator 154, and more particularly with the fins of the outer radiator 154 to transfer the heat from the heat pipe 152a-b to the fins and then to the cool air stream 55. In particular, each heat pipe 152a-b passes through the fins through an orifice provided for that purpose in each fin.

The outer radiator 154 thus constitutes a condenser.

The cooling system 150 also comprises a housing 156 in which is housed the second end of each heat pipe 152a-b.

In the embodiment of the invention presented in FIG. 2, the housing 156 is divided by an internal wall 157 which divides the internal volume of the housing 156 into two chambers fluidically isolated from one another and in which the second end of each heat pipe 152a-b is present in each chamber by passing through the internal wall 157.

Figure 3:
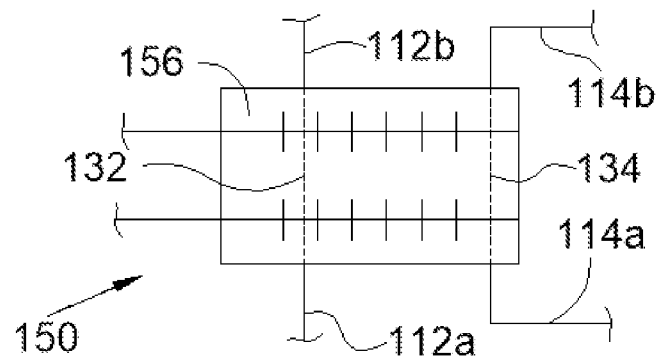
FIG. 3 is a schematic representation of the housing according to another embodiment of the invention.
Figure 4:
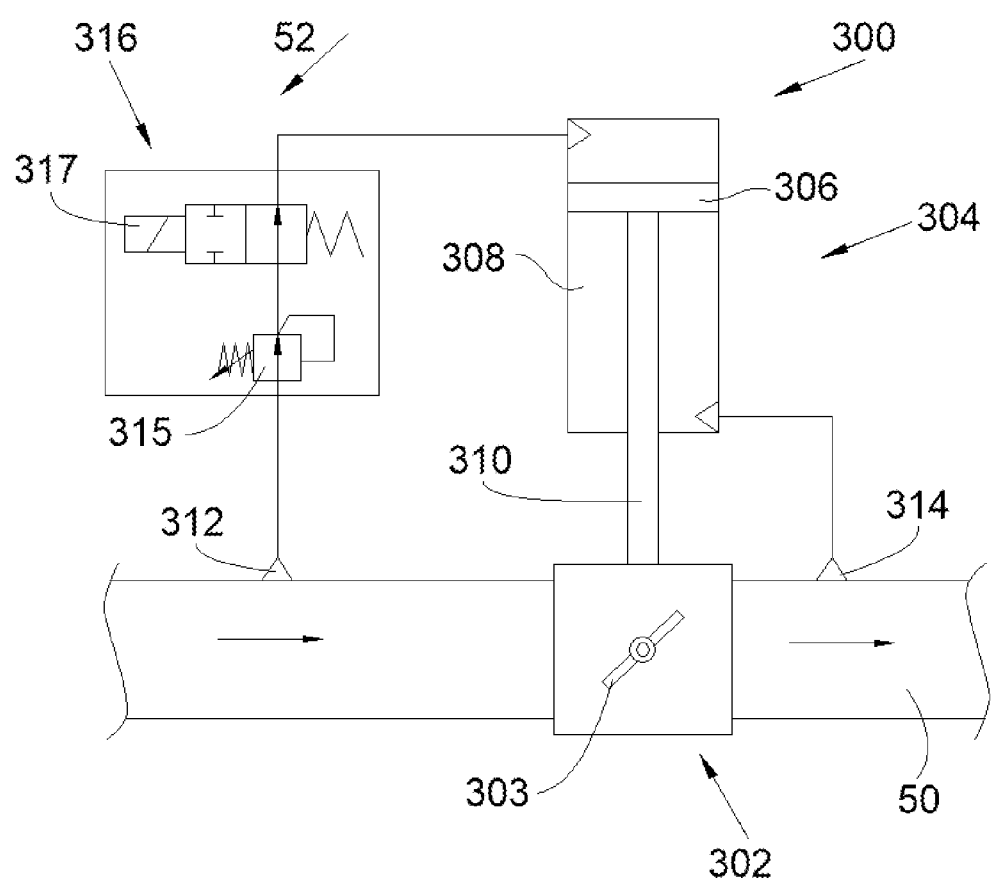
FIG. 4 is a schematic representation of a regulation system of the state of the art.

In the embodiment of FIG. 3, the housing 156 comprises a single chamber in which is housed the second end of each heat pipe 152a-b.

The upstream air intake 312 is fluidically connected to a first inlet of the housing 156 by a first upstream duct 112a.

A first outlet of the housing 156 is fluidically connected to the inlet of the regulator 316 by a second upstream duct 112b.

In the embodiment of the invention represented in FIG. 2, the second upstream duct 112b is extended from the inlet of the regulator 316 to the first inlet of the actuator 304 by passing in succession through the pressure reducer 315, the solenoid valve 317 and the outlet of the regulator 316.

The first inlet of the housing 156 and the first outlet of the housing 156 are fluidically connected by a first fluidic path which passes through the housing 156.

The downstream air intake 314 is fluidically connected to a second inlet of the housing 156 by a first downstream duct 114a.

A second outlet of the housing 156 is fluidically connected to a second inlet of the actuator 304, and, here, to the other chamber of the actuator 304 by a second downstream duct 114b.

The second inlet of the housing 156 and the second outlet of the housing 156 are fluidically connected by a second fluidic path which passes through the housing 156.

The first fluidic path and the second fluidic path are separated from one another, that is to say, they are fluidically tight with respect to one another. Each fluidic path is thus inside the housing 156.

The operation of the regulation system 100 is identical to the operation of the regulation system 300 of the state of the art.

Thus, the heat conveyed by the first upstream duct 112a and the second downstream duct 114a is transferred to the second end of each heat pipe 152a-b by passing through the housing 156 which thus constitutes an evaporator. The housing 156 is disposed upstream with respect to the regulator 316, that is to say, between the upstream air intake 312 and the inlet of the regulator 316.

Thus, the hot air passing through the first upstream duct 112a and the second upstream duct 114a is cooled in passing through the housing 156 before arriving respectively at the regulator 316 or at the actuator 304. The heat is transferred to the second end of each heat pipe 152a-b then, by internal operation of each heat pipe 152a-b, the heat is transferred to the first end of each heat pipe 152a-b and discharged by the fins of the outer radiator 154.

The temperature gradients between the second end (hot end) and the first end (cold end) of the heat pipe 152a-b generate pressure gradients which create a circulation of the heat-transfer fluid inside the heat pipe 152a-b allowing mass transport and therefore the transport of heat between the evaporator 156 and the condenser 154. Indeed, according to a continuous cycle: the heat-transfer liquid is heated in the evaporator 156 and is vaporized and the vapor generated is directed to the cold end of the heat pipe 152a-b where it is condensed in restoring the latent heat that it has accumulated. The liquid thus formed returns to the hot end of the heat pipe 152a-b under the effect of gravity. Thus, to ensure optimal operation of the cooling system 150, a position of the first end must be higher than the second end.

With such a cooling system 150, the temperature of the air stream picked up at each air intake 312, 314 can be reduced before entering into the regulator 316 or the actuator 304 and, thus, the quantity of cool air 55 does not need to be increased and can even be reduced by comparison to the direct cooling principle in the case of the state of the art and the efficiencies of the turbojet engine are thus guaranteed.

In the embodiment of FIG. 2, the first fluidic path comprises one of the chambers of the housing 156 which extends between the first inlet and the first outlet of the housing 156, and the second fluidic path comprises the other chamber of the housing 156 which extends between the second inlet and the second outlet of the housing 156.

In the embodiment of FIG. 3, the first fluidic path comprises a first internal duct 132 fluidically connected between the first upstream duct 112a and the second upstream duct 112b, and the second fluidic path comprises a second internal duct 134 fluidically connected between the first downstream duct 114a and the second downstream duct 114b.

In the embodiment of FIG. 3, to improve the transfer of heat in the housing 156, the first internal duct 132 and the second internal duct 134 are wound around the second end of each heat pipe 152a-b. Furthermore, the second end of each heat pipe 152a-b can be equipped with fins.

According to a particular embodiment, at least one heat pipe 152b is in contact with the walls of the regulator 316 to also allow the calories to be discharged from the regulator 316 and thus reduce the temperature thereof. The heat pipe 152b is, for example, incorporated in or glued to the walls of the regulator 316.

Each heat pipe 152a-b is, preferably, provided with a wick, arranged on the inner wall of the pipe (that is to say, the wall in contact with the fluid) and produced according to different techniques which can be coupled, such as, for example, by the creation of grooves on the inner wall of the heat pipe 152a-b with grooves which extend along the length of the heat pipe 152a-b, or by a metallic sintering arranged on the inner wall of the heat pipe 152a-b.

When the heat pipe 152a-b is provided with a wick, the liquid formed returns to the hot end of the heat pipe 152a-b with the assistance of the capillary forces.

In this case, contrary to what has been stated above, when the heat pipe 152a-b is provided with a wick, the position of the first end need not strictly be arranged higher than the second end to ensure the operation of the cooling system 150, even though such a configuration does optimize the efficiency of the cooling system 150. Indeed, the first end and the second end can be arranged at the same height.

Each heat pipe 152a-b is produced in a metallic material, such as, for example, copper, aluminum, stainless steel or titanium. The heat-transfer fluid situated inside the heat pipe 152a-b is a fluid compatible with aeronautical applications and with extreme flight conditions (temperature, pressure, etc.), such as, for example, water, ethanol, methanol.

The heat-transfer fluid fills, for example, 50% of the total internal volume of the heat pipe 152a-b.

The housing 156 is produced in a metallic material, such as, for example, titanium, aluminum, copper or stainless steel.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A regulation system configured to ensure the flow rate regulation of a duct in which circulates a hot air stream, the regulation system comprising:
   a valve equipped with a shutter configured to be housed in the duct,
   an upstream air intake configured to be arranged on the duct upstream of the valve,
   a downstream air intake configured to be arranged on the duct downstream of the valve,
   a regulator comprising an inlet and an outlet and allowing or preventing passage of air based on a pressure at the inlet, and
   an actuator actuating the shutter and comprising a first inlet and a second inlet, in which the first inlet is fluidically connected to the outlet of the regulator,
   wherein the regulation system comprises a cooling system which comprises:
      an outer radiator subjected to an air stream,
      a housing comprising a first inlet, a second inlet, a first outlet and a second outlet, a first fluidic path, inside the housing, fluidically connecting the first inlet and the first outlet through the housing, and a second fluidic path, inside the housing, fluidically connecting the second inlet and the second outlet through the housing, the first and second fluidic paths being separated,
      at least one heat pipe, each heat pipe comprising a first end in contact with the outer radiator and a second end housed in the housing,
      a first upstream duct fluidically connecting the upstream air intake to the first inlet of the housing,
      a second upstream duct fluidically connecting the first outlet of the housing to the inlet of the regulator,
      a first downstream duct fluidically connecting the downstream air intake to the second inlet of the housing, and
      a second downstream duct fluidically connecting the second outlet of the housing to the second inlet of the actuator.

2. The regulation system according to claim 1,
   wherein the housing is divided into two chambers fluidically isolated from one another by an internal wall,
   wherein the second end of each heat pipe is present in each chamber,
   wherein the first fluidic path comprises one of the two chambers which extends between the first inlet and the first outlet of the housing, and
   wherein the second fluidic path comprises an other of the two chambers which extends between the second inlet and the second outlet of the housing.

3. The regulation system according to claim 1,
   wherein the first fluidic path comprises a first internal duct fluidically connected between the first upstream duct and the second upstream duct, and
   wherein the second fluidic path comprises a second internal duct fluidically connected between the first downstream duct and the second downstream duct.

4. The regulation system according to claim 3, wherein the first internal duct and the second internal duct are wound around the second end of each heat pipe.

5. The regulation system according to one claim 1, wherein at least one heat pipe is in contact with walls of the regulator.

6. The regulation system according to claim 1, wherein the outer radiator comprises fins and wherein each heat pipe passes through the fins through an orifice in each fin.

7. A turbojet engine of an aircraft, said turbojet engine comprising:
   compression stages,
   a duct in which circulates a hot air stream coming from the compression stages, and
   a regulation system according to claim 1.

8. The turbojet engine according to claim 7,
   wherein the turbojet engine comprises a secondary air flow, and
   wherein the outer radiator is configured to be subjected to an air stream taken from the secondary air flow.

9. An aircraft comprising a turbojet engine according to claim 7.

* * * * *